US012273979B2

(12) United States Patent
Kratochvil et al.

(10) Patent No.: US 12,273,979 B2
(45) Date of Patent: *Apr. 8, 2025

(54) OPERATING A BUILDING MANAGEMENT SYSTEM USING A LIGHTING CONTROL INTERFACE

(71) Applicant: Honeywell International Inc., Charlotte, NC (US)

(72) Inventors: Miroslav Kratochvil, Prostejov (CZ); Ondrej Jemelka, Kokory (CZ); Vojtech Vladyka, Brno (CZ); David Sedlacek, Brno (CZ); Milan Kriz, Rajecko (CZ); Ian Walley, Hove (GB); Sahand Ghanoun, Guildford (GB); Michael Andrew Simpson, Horsham (GB)

(73) Assignee: Honeywell International Inc., Charlotte, NC (US)

( * ) Notice: Subject to any disclaimer, the term of this patent is extended or adjusted under 35 U.S.C. 154(b) by 15 days.

This patent is subject to a terminal disclaimer.

(21) Appl. No.: 18/088,968

(22) Filed: Dec. 27, 2022

(65) Prior Publication Data
US 2023/0217574 A1    Jul. 6, 2023

Related U.S. Application Data

(63) Continuation of application No. 16/426,311, filed on May 30, 2019, now Pat. No. 11,540,378.

(51) Int. Cl.
*H05B 47/175* (2020.01)
*G05B 15/02* (2006.01)
(Continued)

(52) U.S. Cl.
CPC .......... *H05B 47/175* (2020.01); *G05B 15/02* (2013.01); *G05B 19/048* (2013.01); *H04W 4/029* (2018.02);
(Continued)

(58) Field of Classification Search
CPC .... H05B 47/175; H05B 47/105; H05B 47/11; H05B 47/12; H05B 47/125; H05B 47/18;
(Continued)

(56) References Cited

U.S. PATENT DOCUMENTS

| 2013/0127359 A1* | 5/2013 | Hilbe ................... H05B 47/165 315/210 |
| 2013/0182103 A1 | 7/2013 | Lee et al. |

(Continued)

FOREIGN PATENT DOCUMENTS

| CA | 2971061 A1 | 12/2017 |
| GB | 2519769 A | 5/2015 |
| WO | 02/082283 A2 | 10/2002 |

OTHER PUBLICATIONS

Dalismartlink, DaliSmartLink Product Range, http://dalismartlink.com/products/, 2014, 5 pages.
(Continued)

*Primary Examiner* — Mohammad Ali
*Assistant Examiner* — Sheela Rao
(74) *Attorney, Agent, or Firm* — Brooks, Cameron & Huebsch, PLLC

(57) ABSTRACT

Devices, systems, and methods for operating a building management system using a lighting control interface are described herein. One device includes an occupancy sensing component, a lighting control interface configured to connect the occupancy sensing device to a lighting control channel of a building, and a building management system (BMS) interface configured to connect the occupancy sensing device to a BMS channel of the building.

20 Claims, 3 Drawing Sheets

(51) Int. Cl.
  *G05B 19/048*   (2006.01)
  *H04W 4/029*   (2018.01)
  *H05B 47/105*   (2020.01)
  *H05B 47/11*   (2020.01)
  *H05B 47/12*   (2020.01)
  *H05B 47/125*   (2020.01)
(52) U.S. Cl.
  CPC ........... *H05B 47/105* (2020.01); *H05B 47/11* (2020.01); *H05B 47/12* (2020.01); *H05B 47/125* (2020.01); *G05B 2219/2642* (2013.01)
(58) Field of Classification Search
  CPC .............. G05B 15/02; G05B 19/048; G05B 2219/2642; H04W 4/029; Y02B 20/40
  See application file for complete search history.

(56)            References Cited

U.S. PATENT DOCUMENTS

2015/0227870  A1*  8/2015  Noboa ............... G06Q 10/0635
                                                705/7.28
2016/0126733  A1   5/2016  Hick et al.
2017/0364046  A1*  12/2017 Westrick, Jr. .......... G05B 15/02
2018/0042064  A1*  2/2018  Norton .................... H04W 4/06
2018/0343726  A1   11/2018 Carberry et al.
2018/0373111  A1   12/2018 Brown
2019/0174389  A1   6/2019  Kamp et al.
2019/0313507  A1   10/2019 Kim
2020/0320023  A1*  10/2020 Litichever ............... G06F 21/56
2020/0326677  A1   10/2020 Gamroth et al.

OTHER PUBLICATIONS

Ziegenfus, "Understand BACnet communications for control and monitoring of networked lighting", LEDs Magazine, https://www.ledsmagazine.com/smart-lighting-iot/article/16695631/understand-bacnet-communications-for-control-and-monitoring-of-networked-lighting, Feb. 17, 2017, 7 pages.
Intelligent Environments, "ASB North Wharf", https://www.intelligentenvironments.co.nz/projects/asb-commercial-lighting-control/, retrieved Apr. 30, 2018, 5 pages.
Extended European Search Report for related EP Application No. 20176200.2, mailed Sep. 29, 2020 (8 bgs).
European Communication Pursuant to Article 94(3) EPC for related European Application No. 20176200.2, mailed Oct. 13, 2021 (6 pgs).

* cited by examiner

OPERATING A BUILDING MANAGEMENT SYSTEM USING A LIGHTING CONTROL INTERFACE

TECHNICAL FIELD

The present disclosure relates to operating a building management system using a lighting control interface.

BACKGROUND

A number of aspects of a building can be managed by a building management system (BMS). A lighting system in a building can be controlled via a lighting control system. For example, a Digital Addressable Lighting Interface (DALI) may control lighting in a building.

In some buildings, a BMS and a lighting control system may operate simultaneously. However, previous approaches to using both a BMS and a lighting control system may be met with communication issues. In previous approaches, lighting control system devices may not be able to communicate with the BMS directly (and vice versa). Instead, data may be communicated between the lighting control system and the BMS via a different system or device acting as an intermediary. For example, communication of data between a lighting control system and a BMS can be carried out via a high-level controller, such as a Java Application Control Engine (JACE), for instance. However, installing, commissioning, and setup of the systems to communicate through this higher level may be costly and time-consuming.

DETAILED DESCRIPTION

Figure 1:
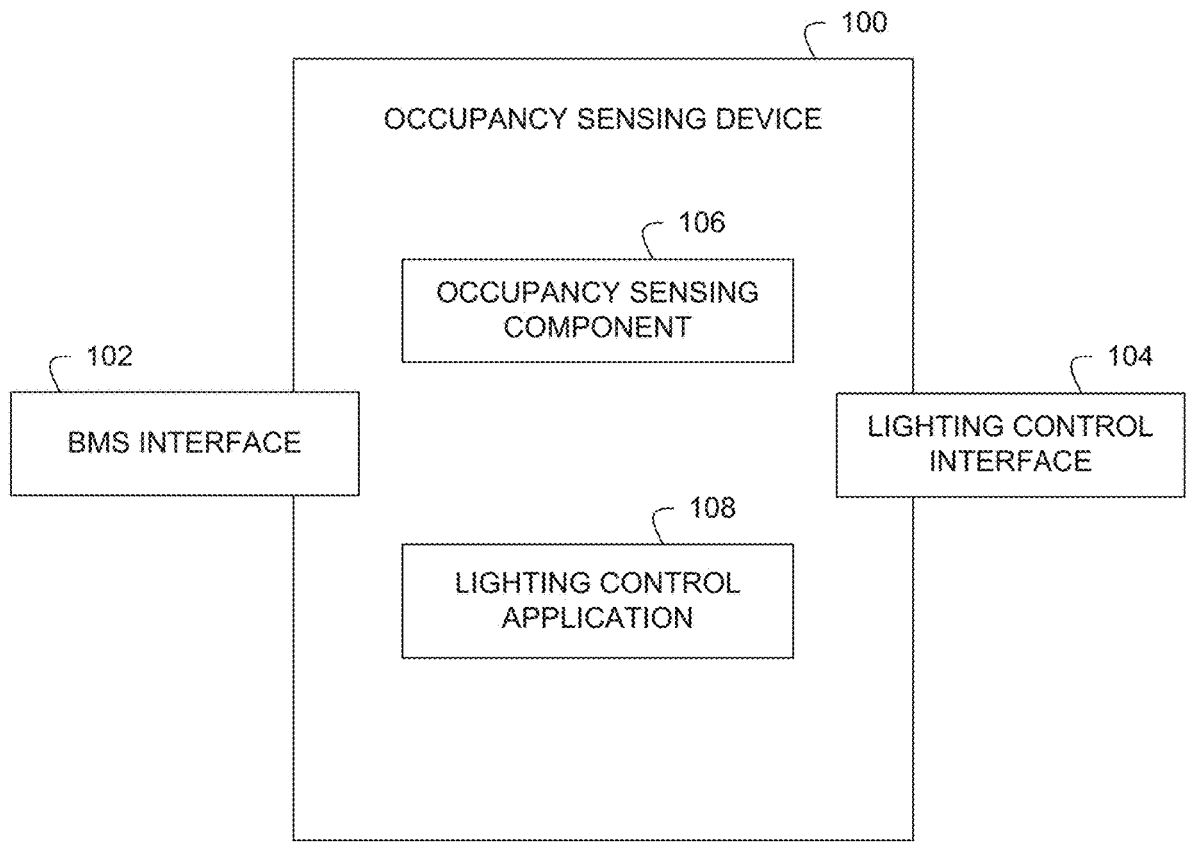
FIG. 1 illustrates an occupancy sensing device in accordance with one or more embodiments of the present disclosure.

Operating a BMS using a lighting control interface is described herein. For example, one or more embodiments include an occupancy sensing device, comprising an occupancy sensing component, a lighting control interface configured to connect the occupancy sensing device to a lighting control channel of a building, and a building management system (BMS) interface configured to connect the occupancy sensing device to a BMS channel of the building.

An occupancy sensing device that includes both a lighting control interface (e.g., port) and a BMS interface can allow the direct exchange of data between a BMS and a lighting control system. In the present disclosure, reference may be made to the specific example of a Digital Addressable Lighting Interface (DALI) as a lighting control system. However, it is to be understood that embodiments herein are not so limited.

Previous approaches to using both a BMS and a DALI in a building are met with issues associated with their different protocols. For instance, a BMS may use a first protocol (sometimes referred to herein as a "BMS protocol") and a lighting system may use a second protocol (sometimes referred to herein as a "lighting control protocol" or "DALI protocol"). BMS protocols can include, for example, SYmbolic LinK (SYLK), DeviceNet, Simple Object Access Protocol (SOAP), Extensible Markup Language (XML), BACnet, LonWorks, Modbus, and others. Lighting control protocols can include, for example, DALI, Digital Serial Interface (DSI), DMX512, and others.

The different protocols of BMSs and lighting systems can cause communication issues. In previous approaches, for instance, lighting control system devices may not be able to communicate with the BMS directly (and vice versa). Instead, data may be communicated between the lighting control system and the BMS via a different system or device acting as an intermediary, such as a Java Application Control Engine (JACE), for instance. However, installing, commissioning, and setup of the systems to communicate through this higher level may be costly and time-consuming.

In contrast, embodiments herein allow the direct exchange of data between a BMS and a lighting control system. In an example, lighting adjustments can be made at a user interface of a BMS, communicated along a BMS channel (e.g., a BMS bus) to an occupancy sensor in accordance with one or more embodiments herein. The adjustment (e.g., the activation of a particular ceiling light) can be translated by the occupancy sensing device from the BMS protocol to the lighting control protocol. The translated adjustment can be communicated along a lighting control channel (e.g., a DALI bus) to the target device where the adjustment is effectuated. A status of the adjustment (e.g., a notification that the particular ceiling light is activated) can be communicated back to the user interface of the BMS and displayed thereon. All of this data can be exchanged without the use of higher layers or levels of communication. For example, embodiments of the present disclosure can all the exchange of such data in the absence of a JACE or a universal controller.

In some previous approaches, building management and lighting control may be enabled by a same device (e.g., referred to as a control unit, a floor controller, a centralized controller, etc.) that lacks an integrated sensing element. Such devices may include those provided by DISTECH CONTROLS™, for instance. However, because the lighting control system and the BMS system are each controlled by the device, should that device fail, the lighting control system and the BMS each fail. In contrast, if an occupancy sensor in accordance with embodiments of the present disclosure should fail, the lighting control system and the BMS continue to operate normally. For instance, if an occupancy sensing component of an occupancy sensor in accordance with embodiments herein should fail, the occupancy sensor can continue to function as a lighting controller. Stated differently, embodiments herein can continue to provide a desired lighting setting despite a failure of the BMS.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of resistors" can refer to one or more resistors.

FIG. 1 illustrates an occupancy sensing device 100 in accordance with one or more embodiments of the present disclosure. The device 100 can include a BMS interface 102, a lighting control interface 104, an occupancy sensing component 106, and a lighting control application 108. It is noted that these components are not to be taken in a limiting sense.

The BMS interface 102 can be a port, for instance, configured to connect the device 100 to a BMS channel and/or devices of a BMS. In some embodiments, the BMS interface 102 can include an RS-232 port; in some embodiments, the BMS interface 102 can include an RS-485 port, though embodiments herein are not so limited.

The lighting control interface 104 can be a port, for instance, configured to connect the device 100 to a lighting control channel and/or lighting control devices. In some embodiments, the lighting control interface 104 is a two-wire DALI interface, though embodiments herein are not so limited. For example, the lighting control interface 104 can be a 0-10 Volt interface or a switching interface.

the occupancy sensing component 106 is a component including hardware and/or instructions executable to allow the determination of occupancy or non-occupancy of an area (e.g., a room). Embodiments herein do not limit the occupancy sensing component 106 to a particular type of component. For example, the occupancy sensing component 106 can include a microwave occupancy sensor, an ultrasonic occupancy sensor, and/or an optical occupancy sensor, though embodiments of the present disclosure are not so limited.

Thought not illustrated in FIG. 1, the device 100 can include other components. For instance, the device 100 can include an illumination level sensing component. The illumination level sensing component can determine an illumination level (e.g., 450 lux) and allow a desired brightness of lighting to be achieved. In some embodiments, the device 100 can include a temperature sensor. The temperature sensor, for example, can be utilized to control window blinds and/or adjust temperature settings.

The lighting control application 108 can include hardware, logic, and/or instructions executable to translate data from a first type to a second type and from the second type to the first type. As previously discussed, a BMS may use a first protocol and a lighting control system may use a second protocol. The lighting control application 108 can receive data of the first protocol and translate the data to the second protocol. The lighting control application 108 can receive data of the second protocol and translate the data to the first protocol. Stated differently, the lighting control application can translate data between one or more BMS protocols and one or more lighting control protocols. The lighting control application 108 can include one or more communication libraries linking data between disparate protocols.

In some embodiments, the lighting control application 108 can be implemented via a memory and a processor. The Memory can be any type of storage medium that can be accessed by processor to perform various examples of the present disclosure. For example, memory can be a non-transitory computer readable medium having computer readable instructions (e.g., computer program instructions) stored thereon that are executable by processor to translate data communicated between a lighting control channel and a BMS channel in accordance with embodiments herein.

Memory can be volatile or nonvolatile memory. Memory can also be removable (e.g., portable) memory, or non-removable (e.g., internal) memory. For example, memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

Figure 2:
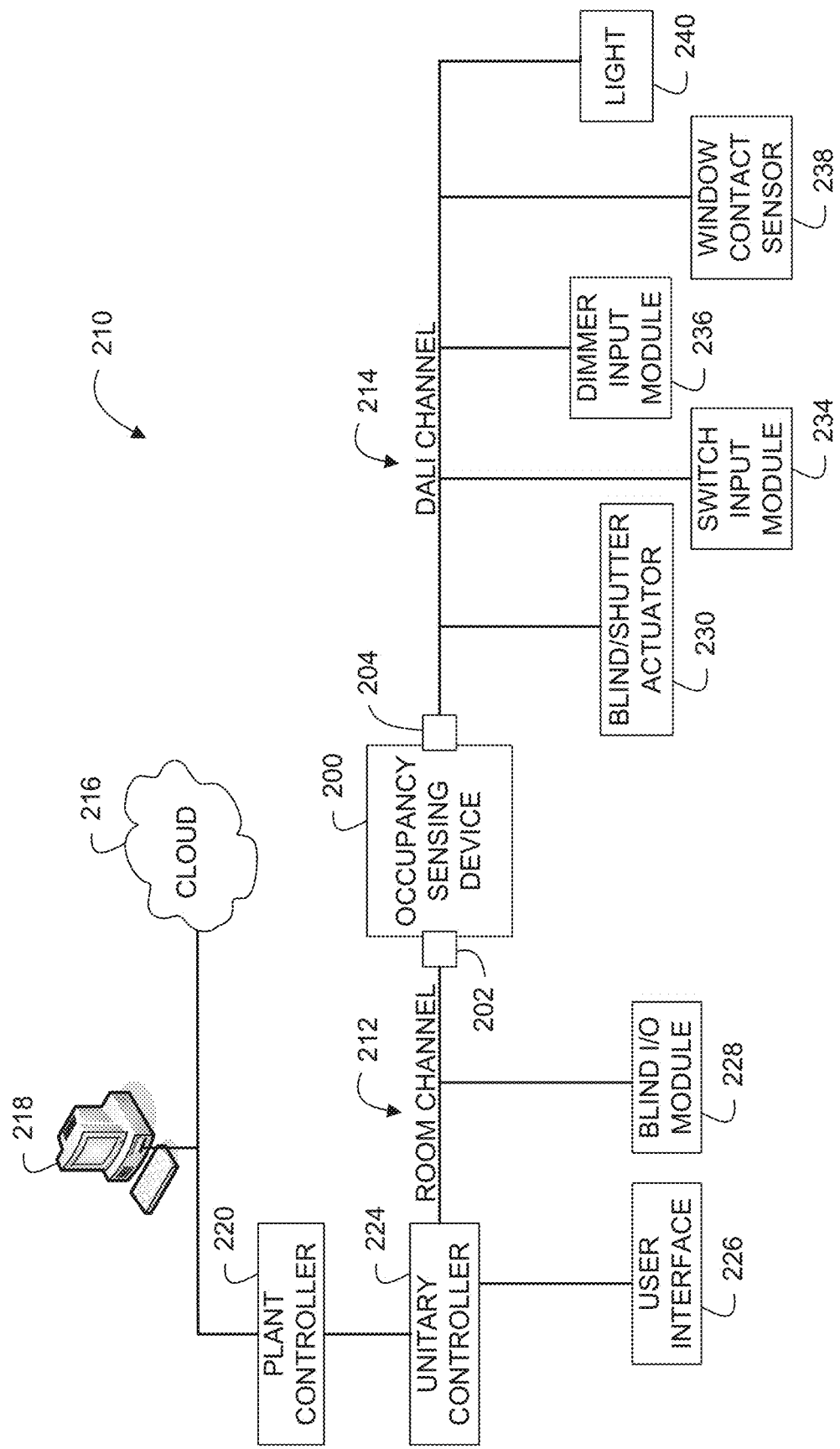
FIG. 2 illustrates a system including an occupancy sensing device in accordance with one or more embodiments of the present disclosure.

FIG. 2 illustrates a system 210 including an occupancy sensing device 200 in accordance with one or more embodiments of the present disclosure. As described in connection with FIG. 1, the occupancy sensing device 200 can include a BMS interface 202 and a lighting control interface 104. The BMS interface 202 can enable the occupancy sensing device 200 to be connected to a BMS channel (e.g., room channel 212). The lighting control interface 204 can enable the occupancy sensing device 200 to be connected to a lighting control channel (e.g., DALI channel 214).

The room channel 212 can include a plurality of BMS devices. Each of the BMS devices illustrated in FIG. 2 can include respective BMS interfaces. Example devices are illustrated in FIG. 2 and are not to be taken in a limiting sense. For example, the room channel 212 can include a unitary controller (e.g., room controller) 224, a user interface 226, and a blind I/O module 228. The unitary controller 224 can be a device configured to provide control of BMS devices including, for example, air handling units (AHUs), ventilators, fan coil units, heat pumps, etc. The unitary controller 224 may be associated with a particular area of a building (e.g., a room). The blind I/O module can be configured to provide switching operations for blinds (e.g., sunblinds).

In some embodiments, the user interface 226 can be a graphical user interface (GUI) that can include a display (e.g., a screen) that can provide and/or receive information to and/or from a user. The display can be, for instance, a touch-screen (e.g., the GUI can include touch-screen capabilities). As an additional example, user interface 226 can include a keyboard and/or mouse the user can use to input (e.g., enter) information into user interface 226. Embodiments of the present disclosure, however, are not limited to a particular type(s) of user interface.

The user interface 226 can be a wall module in some embodiments. The user interface 226 can be an interface in a room associated with comfort control in the room. Control of one or more aspects of physical comfort can be provided via the user interface 226. For example, the user interface 226 can receive inputs associated with controlling fan speed, room temperature, and/or lighting, among other aspects of comfort. In some embodiments, communication between devices of the room channel 212 and/or DALI channel 214 can be wirelessly provided via Bluetooth®. In addition, the user interface 226 can be used to configure the occupancy sensing device 200. Stated differently, the occupancy sensing device 200 can receive configuration settings from the user interface 226.

The room channel 212 can be connected to higher levels of the BMS via a plant controller 224. The plant controller 224 can be configured to provide closed-loop and/or open-loop control and monitoring of BMS systems, such as heating, ventilation, and air conditioning (HVAC) systems, for instance. Supervisory control and/or monitoring of the BMS can be provided via a computing device 218 and connectivity to other systems and/or networks (e.g., the Internet) can be provided via cloud services 216.

The DALI channel 214 can include a plurality of lighting control system devices. Each of the lighting control system devices illustrated in FIG. 2 can include respective lighting control system interfaces. Example devices are illustrated in FIG. 2 and are not to be taken in a limiting sense. It is again noted that though "DALI channel 214" is discussed, embodiments herein are not limited to a particular lighting control system. The DALI channel 214 can, for example, include a blind/shutter actuator 230 configured to control the position of blinds and/or shutters, a switch input module 234 configured to control the power status of one more lights (e.g., on or off), a dimmer input module 236 configured to control a brightness of one or more lights, a window contact sensor 238 configured to determine a position or status of a window (e.g., open or closed), and a light 240. The lighting control devices, including the occupancy sensing device 200, can be installed in a room. Lighting control systems in accordance with embodiments herein may include more or fewer devices than the example devices illustrated in FIG. 2. For example, in some embodiments, a lighting control system can include 64 lighting control devices.

As shown, connectivity between the room channel 212 of the BMS and the DALI channel 214 of the system 210 can be provided without the use of a device such as a universal controller (e.g., a JACE). Embodiments herein can provide a direct link between the room channel 212 and the DALI channel 214. For example, a lighting request can be received via the user interface 226 of the BMS room channel 212, translated by the occupancy sensing device 200 and effectuated on the DALI channel 214 without the request "leaving the room" for translation by a higher-level device, such as a JACE.

Figure 3:
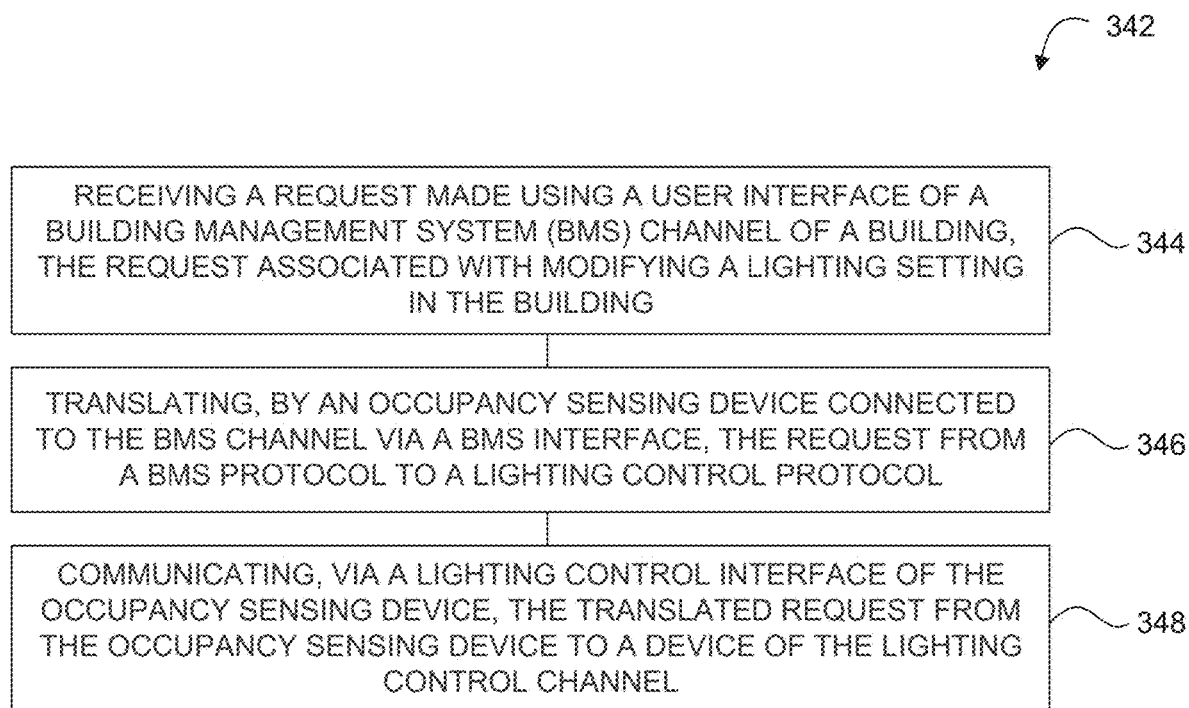
FIG. 3 is a flow chart illustrating a method of operating a building management system using a lighting control interface in accordance with one or more embodiments of the present disclosure.

FIG. 3 is a flow chart illustrating a method 342 of operating a building management system using a lighting control interface in accordance with one or more embodiments of the present disclosure. The method 342 can be implemented via one or more BMS and/or lighting control system devices, such as those discussed in connection with FIGS. 1 and/or 2.

At 344, method 342 includes receiving a request made using a user interface of a BMS channel of a building, the request associated with modifying a lighting setting in the building. In some embodiments, such a request can be a request to adjust brightness. In some embodiments, such a request can be a request to activate or deactivate a light. In some embodiments, such a request can be a request to open or close blinds.

At 346, method 342 includes translating, by an occupancy sensing device connected to the BMS channel via a BMS interface, the request from a BMS protocol to a lighting control protocol. Translating can include translating the request to one or more commands specified by the lighting control protocol. Such commands are known to those of skill in the art and can include, for instance, commands to set values, send off commands, determine device status, etc.

At 348, method 342 includes communicating, via a lighting control interface of the occupancy sensing device, the translated request (e.g., command) from the occupancy sensing device to a device of the lighting control channel. For example, the translated request can be sent to a controller associated with a particular light. The controller can modify a setting of the light (e.g., brightness, activation state, etc.) according to the request. In some embodiments, a status of the modification can be displayed via the user interface.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. An occupancy sensing device, comprising:
   an occupancy sensing component;
   a lighting control port configured to directly connect the occupancy sensing device to a digital addressable lighting interface (DALI) lighting control channel of a building; and
   a building management system (BMS) port configured to directly connect the occupancy sensing device to a BMS channel of the building.

2. The device of claim 1, wherein the occupancy sensing component includes an optical occupancy sensor.

3. The device of claim 1, wherein the occupancy sensing component includes a microwave occupancy sensor.

4. The device of claim 1, wherein the occupancy sensing component includes an ultrasonic occupancy sensor.

5. The device of claim 1, wherein the BMS port includes at least one of: an RS-232 port, a current loop interface, and an RS-485 port.

6. The device of claim 1, wherein the lighting control port includes one of:
- a DALI interface;
- a 0-10 Volt interface; and
- a switching interface.

7. The device of claim 1, wherein the device is configured to receive configuration settings from a user interface of the BMS channel via the BMS port.

8. The device of claim 1, wherein the device includes a lighting control application configured to translate data communicated between the lighting control channel and the BMS channel.

9. The device of claim 1, wherein the device includes at least one of:
- an illumination level sensing component; and
- a temperature sensor.

10. A system, comprising:
- a building management system (BMS) including a plurality of BMS devices of a building;
- a lighting control system including:
  - a plurality of lighting control system devices connected to a lighting control bus; and
  - an occupancy sensing device associated with the plurality of lighting control system devices, wherein the occupancy sensing device includes:
    - an occupancy sensing component;
    - a BMS port configured to directly connect the occupancy sensing device to the BMS system;
    - a digital addressable lighting interface (DALI) lighting control port configured to directly connect the occupancy sensing device to the lighting control bus;
    - a lighting control application configured to translate data communicated between the lighting control system and the BMS system.

11. The system of claim 10, wherein the BMS uses a first protocol and wherein the lighting control system uses a second protocol.

12. The system of claim 10, wherein each of the plurality of lighting control system devices includes a respective DALI port.

13. The system of claim 10, wherein each of the plurality of BMS devices includes a respective BMS port.

14. The system of claim 10, wherein the plurality of lighting control system devices includes lights, sensing devices, and switch inputs.

15. The system of claim 10, wherein the plurality of lighting control system devices includes 64 devices.

16. The system of claim 10, wherein the BMS system includes a plant controller, a unitary controller, and a user interface configured to receive input associated with comfort control in a room.

17. The system of claim 10, wherein the lighting control application is configured to translate data communicated between the lighting control system and the BMS system in the absence of a Java Application Control Engine (JACE).

18. A method of operating a building management system using a lighting control interface, comprising:
- receiving a request made using a user interface of a building management system (BMS) channel of a building, the request associated with modifying a lighting setting in the building;
- translating, by an occupancy sensing device connected to the BMS channel via a BMS port, the request from a BMS protocol to a lighting control protocol; and
- communicating, via a lighting control port of the occupancy sensing device, the translated request from the occupancy sensing device to a device of the lighting control channel.

19. The method of claim 18, wherein the user interface is a wall module associated with comfort control in a room of the building, and wherein the occupancy sensing device is installed in the room.

20. The method of claim 18, wherein the method includes modifying the lighting setting in the building according to the request and continuing to provide the modified lighting setting despite a failure of the BMS.

* * * * *